United States Patent [19]
Gacek et al.

[11] 3,760,108
[45] Sept. 18, 1973

[54] SPEECH DIAGNOSTIC AND THERAPEUTIC APPARATUS INCLUDING MEANS FOR MEASURING THE SPEECH INTENSITY AND FUNDAMENTAL FREQUENCY

[75] Inventors: Joseph A. Gacek, Cape Canaveral; Joseph E. Parker, Cocoa Beach, both of Fla.

[73] Assignee: Tetrachord Corporation, Cocoa Beach, Fla.

[22] Filed: Sept. 30, 1971

[21] Appl. No.: 185,272

[52] U.S. Cl. .............................................. 179/1 SA
[51] Int. Cl. ............................................. G10l 1/04
[58] Field of Search ............. 179/1 SA, 1 VS, 1 VC; 324/77 A, 77 B, 77 E

[56] References Cited
UNITED STATES PATENTS

| | | | |
|---|---|---|---|
| 3,364,425 | 1/1968 | Peterson | 179/1 SA |
| 3,546,584 | 12/1970 | Scarr | 179/1 SA |
| 3,236,947 | 2/1966 | Clapper | 179/1 SA |
| 3,416,080 | 12/1968 | Wright | 179/1 SA |

FOREIGN PATENTS OR APPLICATIONS

| | | | |
|---|---|---|---|
| 1,155,422 | 6/1969 | Great Britain | 170/1 SA |

OTHER PUBLICATIONS

Blasser & Fincky, Automatic Loudness Analysis, Hewlett – Packard Journal, pp. 12–19, Nov. 1967.

Primary Examiner—Kathleen H. Claffy
Assistant Examiner—Jon Bradford Leaheey
Attorney—Duckworth and Hobby

[57] ABSTRACT

An apparatus for the measurement of fundamental vocal frequencies and relative speech intensity is provided which apparatus has an immediate feedback of information. An input of a complex wave form into the present apparatus produces an output indicating whether the intensity of the input exceeds a predetermined set level. The input is also applied to a harmonic inhibitor circuit which produces an output of the lowest frequency component of the input complex waveform and inhibits harmonics of this lowest frequency component and produces an output indicative of whether the fundamental vocal frequency detected is within a predetermined selected range.

9 Claims, 3 Drawing Figures

INVENTOR.
Joseph A. Gacek
Joseph E. Parker
BY Duckworth & Hobby
ATTY'S.

3,760,108

SPEECH DIAGNOSTIC AND THERAPEUTIC APPARATUS INCLUDING MEANS FOR MEASURING THE SPEECH INTENSITY AND FUNDAMENTAL FREQUENCY

BACKGROUND OF THE INVENTION

The present invention relates to an apparatus for measuring fundamental vocal frequencies and relative speech intensity while providing an immediate feedback. Such a device is used in teaching speech and in therapeutic and diagnostic speech work.

In the past a great many devices have been provided for use in speech therapy practice for correcting various defects in speech, and for teaching speech to deaf people. One common prior art apparatus teaches a visual sound level indicator for use in a classroom to indicate to a pupil when he is not speaking loud enough, as seen in U. S. Pat. No. 3,480,912. Another prior art device is concerned with speech measuring equipment for measuring the nasal quality of speech, especially for use in evaluating the treatment of cleft palate patients, and is shown in U. S. Pat. No. 3,281,534, while another speech analyzer reads lip and face movements, air velocities and acoustical sounds which are compared and digitally stored and processed, and which is especially adapted for coding speech into binary information for use in digital computer type equipment and is illustrated in U.S. Pat. No. 3,383,466. Finally, in U.S. Pat. No. 3,316,353, it has been suggessted to utilize a lisp meter to measure speech defects involving frictional sounds which result when the tongue, teeth or lips are formed into a construction through which air is passed. There is also a wide variety of art relating to speech recognition devices and particularly to devices for converting information to narrow band electrical signals such as in the typical vocoder device for use in transmission or recording of speech, especially by dividing with filters the spectrum into a number of contiguous narrow bands and then integrating and quantizing each band to reduce normal speech to a few hundred bits of binary information per second. These systems are generally of course quite complex and directed towards different purposes than the present invention. It is accordingly the object of the present invention to provide a portable device which is economical to manufacture and use and to provide a voice control or speech teaching machine for use with the vocally handicapped including the deaf and hard of hearing which provides immediate feedback information for vocal frequency and intensity. The present apparatus can be used to supplement the skill of speech pathologists, speech therapists and clinicians, teachers of the deaf, teachers of the mentally retarded, laryngologists and clinical psychologists for use in measuring habitual pitch levels in the diagnosis of voice disorders, to soften excessively loud voices and strengthen weak voices, and to stimulate local response in non-vocal individuals. Feedback signals provide a simple "yes" for correct or "no" for incorrect sound productions which feedback may be visual for deaf individuals. Vibration transducers can be used to indicate a "yes" or "no" to both deaf and blind individuals to indicate whether they are producing sounds correctly, so that two vibration transducers can indicate correct pitch levels and excessive intensity in speech.

Another object of the present invention is to provide a speech teaching machine which is simple and effective in controlling vocal conformance and which provides built-in timers for effective measurement of progress in correction of faulty voice habits.

SUMMARY OF THE INVENTION

The present invention relates to a speech diagonstic and therapeutic apparatus having an input microphone or a tape recorder input for receiving complex waveforms such as vocal sounds, and generating a voltage signal having the fundamental frequency of these sounds. An overload detector connected to the input detects the vocal intensity of the input when the vocal intensity is in excess of a predetermined level which may be adjusted by the operator. The signal or overload detector is also used to inhibit the operation of the machine when the input intensity level exceeds the predetermined set level. A harmonic inhibitor circuit is also connected to the input and selects the fundamental frequency component and inhibits harmonics thereof. The fundamental freqeuncy detected is then converted to a proportional DC voltage and fed to a voltage comparator which determines whether the fundamental frequency is within predetermined upper and lower frequency levels. A total elapsed time indicator is also provided which measures the duration of correct responses automatically so that the rate of learning is easily plotted on a learning chart from day to day. The harmonic inhibiting circuit is adapted to receive a complex waveform and apply it to a plurality of frequency filters connected in parallel, each filter being low pass in nature having a cutoff frequency one and one half times each preceding filter. A plurality of inhibiting circuits is connected to a plurality of the filters to inhibit the output of all filters with cutoff frequencies higher than the cutoff frequency of the lowest frequency filter having an output. The output of the inhibitor circuits will thus provide a fundamental frequency without higher harmonics.

BRIEF DESCRIPTION OF THE DRAWINGS

Other objects, features and advantages of the invention will be apparent from a study of the written description and the drawings, in which.

DESCRIPTION OF THE PREFERRED EMBODIMENT

Figure 1:
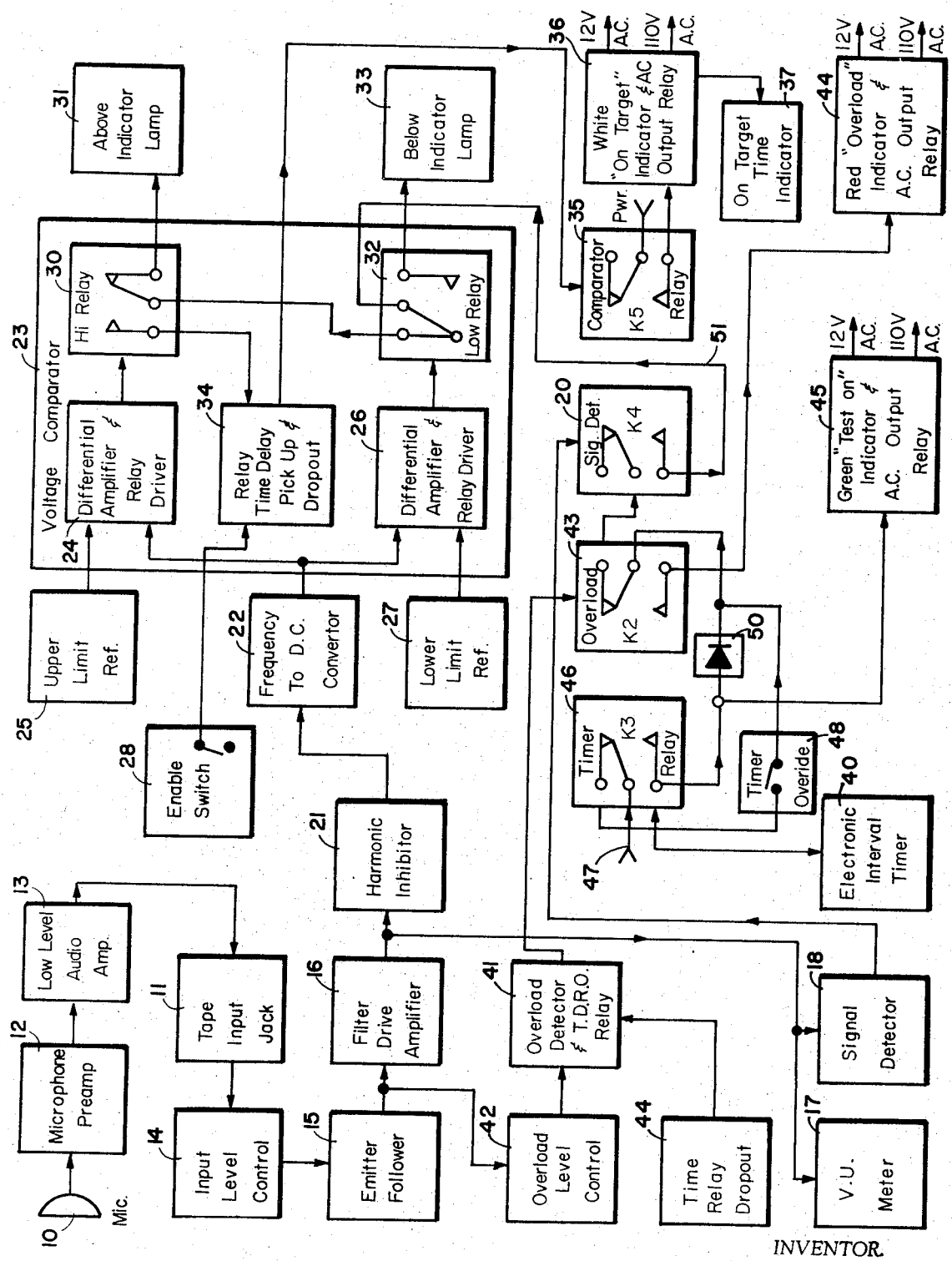
FIG. 1 is a block diagram of the preferred embodiment of the present invention.

Referring now to FIG. 1 of the drawings, a frequency lowering or raising intensity determining apparatus is provided for measurement of fundamental vocal frequency and relative speech intensity. The input of the machine is through a microphone 10 or taped input jack 11. Microphone 10 may be placed in range of a patient or through a pre-taped sample of the patient's speech via the taped input jack 11. The microphone signal is amplified by pre-amplifier 12 and a low level audio-amplifier 13. An input level control 14 adjusts the vocal signal level to the input emitter-follower circuit 15. A filter driver amplifier 16 amplifies the signal and applies the signal to V.U. meter 17 for measuring the correct operating signal level. The output of the filter driver amplifier 16 is also applied to and operates a signal detector circuit 18 which establishes a minimum operating signal level for the apparatus operating relay 20. Filter driver amplifier 16 also drives the harmonic inhibitor circuit 21 which circuit has a plurality of parallel connected filters arranged so there will always be a filter that will have an output of the lowest frequency component of a voice input with rejected second and higher harmonics, as will be described in more detail in connection with FIGS. 2 and 3. Harmonic inhibitor circuit 21 samples the outputs of all the filters except the highest and inhibits the outputs of all filters with an output having a cutoff frequency higher than the lowest filter having an output. The outputs of harmonic inhibitor 21 gates are summed and amplified. The harmonic inhibitor 21 provides an output which will be only the lowest or fundamental vocal frequency and is applied to the frequency to D.C. Converter 22, which may have a scale factor of 60 to 1050 Hz, approximately equal to 0.25 to 4.0 volts D.C., which scale will cover the range of fundamental frequencies from adult males to young children. A voltage comparator circuit 23 is blocked off separately and has a D.C. voltage signal applied from the frequency to D.C. converter 22 and includes therein a differential amplifier and relay driver 24 which has an upper limit reference adjustment 25 which may be a variable resistance, or the like, for adjusting the operating level of the differential amplifier 24. The frequency to D.C. converter 22 is also connected to second differential amplifier and relay driver 26, which is adjusted for a lower frequency limit by a lower reference 27, which may be a variable resistor, or the like, for adjusting the level of operation of the differential amplifier 26. A voltage signal proportional to the vocal frequency from the frequency to D.C. converter 22 is measured by comparing it to an upper limit reference set by adjustment at 25, and a lower limit reference set by a dial control reference at 27 which may be located on the front of the casing of the machine. The measured voltage is compared with the reference voltages in the differential D.C. amplifiers 24 and 26, the outputs of which operate a high relay and a low relay. If the frequency is above the upper limit set on the controls 25, the above amplifier 24 will release the relay 30 which will operate the above indicator lamp 31. If the frequency is below the lower limit set on the controls 27, differential amplifier 26 will operate the relay 32 which will light the below indicator lamp 33. If the frequency is between the upper and lower limits set on the controls 25 and 27, a time delay relay pickup and dropout circuit 34 will be activated in turn operating the comparator relay 35 which will operate the white on target indicator 36, and an A.C. output relay, if desired, along with an elapsed time indicator 37, calibrated in sseconds and tenths of seconds. Time delay pickup 34 is designed to be slightly greater than the maximum rise time of the frequency to D.C. converter 22 or approximately 30 milliseconds. This delay allows a too high in frequency signal to operate the above indicator without causing the on target light indicator to flash. The time delay dropout 34 drops out after approximately 200 milliseconds to allow the on target light indicator to remain on for connected speech in the frequency range set on the controls 25 and 27. The time delay dropout 34 may be inhibited for more precise measurement of target time using the elapsed time indicator 37, which is connected to the on target indicator 36.

The output of the input emitter follower 15 also drives the overload detector 41, which overload detector is set using the overload level control 42 for operation at an excessive vocal level using the normal setting of V.U. meter 17 as a reference. The overload level control 42 may be a variable resistor or pot. Excessive vocal intensity applied to the overload detector will operate the overload relay 43 causing the red penalty indicator 44 to light and also to actuate an A.C. output relay as desired. This will also inhibit the white on target indicator light 30. Time delay dropout settings of 0 to 3 seconds are provided by the control 44 which can be set to provide a penalty for excessive vocal intensity or shouting. Electronic interval timer 40 on the other hand provides an adjustable test time interval in which the output operates a green test on indicator lamp 45 and enables the on target and overload indicators by the operation of the relay 46 having a power input 47. A timer over ride 48 is provided to over ride this circuit when desired by the operator, and allows operation without using the interval time 40. The on target, overload and test on circuits may be used to operate power relays that have an output of 110 volt A.C. and 112 volt A.C. for external indicators and reinforcement accessories if desired. If the electronic interval timer 40 operates the timer relay 46, power fom the circuit 47 drives the green test on indicator 45 and also allows the voltage to be applied to an overload relay 43 via a voltage blocking diode 40 which prevents a voltage through the time over ride 48 being applied to the green test on indicator 45. The overload relay 43 in one position actuates the red overload indicator 44, and in the other position connects this relay to signal relay 20 which is operated by a sufficient signal being detected by signal detector 48. The signal detector relay 20 voltage is applied through conductor 51 to the low relay side 32 which when not actuated, can apply the signal to the high relay 30, which when actuated will apply the signal to the rlay coil 34, actuating this coil so that the relay contacts 35 can be actuated to indicate on target. Thus, the interconnection of the relays will allow a signal detector 18 to disable the operation of the apparatus if the signal is too low; the overload detector 41 will disable the on target and actuate the red overload indicator and the voltage comparator 23 can disable the on target while operating the above or below indicator lamps when voltage inputs exceed upper and lower levels.

Figure 2:
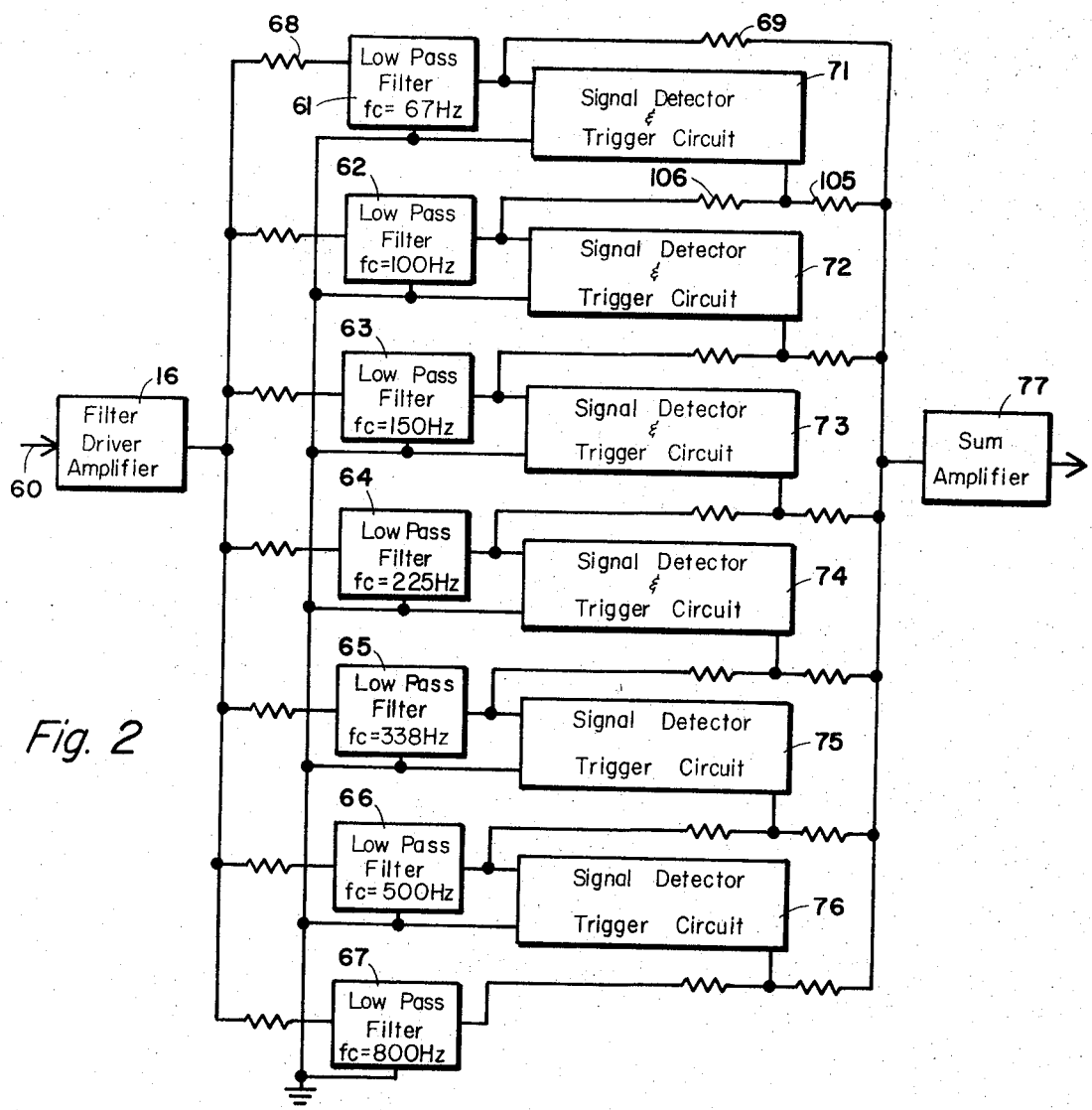
FIG. 2 is a block diagram of the harmonic inhibitor block of FIG. 1.

It should be clear at this point that most of the circuits provided by the block diagrams are conventional circuits except for the harmonic inhibitor which will now be described in connection with FIGS. 2 and 3. The filter-driver amplifier 16 receives an input signal of a complex waveform from an input such as a human voice to drive an array of seven low pass filters 61 through 67 connectd in parallel through 10 K ohm impedance matching resistors 68. Filters 61 through 67 have cutoff frequencies in a ratio of one and one half times each preceding one with ascending frequencies beginning with 67 Hz. The filter cutoff frequencies could for instance be 67 Hz, 100 Hz, 150 Hz, 225 Hz, 338 Hz, 500 Hz and 800 Hz, respectively, for filters 61 through 67. The output of each of the lower six filters is applied to a signal detector and detector circuit 71 through 76, respectively. Each signal detector and trigger circuit 71 through 76 grounds the output of the next higher filter if there is a signal present in that circuit. Thus, with this system of filters the fundamental frequency of the complex waveform is allowed to pass through, but the filters that would pass its harmonics have their outputs to the sum amplifier 77 grounded at the junction between resistors 105 and 106 for filter 62 for example each by the output of the filter below it in frequency. Since the cutoff frequencies are overlapped with a ratio of 1.5 to 1 and attenuate 50 db at 1.5 frequency, the harmonics will be suppressed at least 50 db at the sum amplifier 77. Only circuit 71 is described in connection with FIG. 3, inasmuch as all the circuits are identical in operation. The output of each filter is summed by a pair of isolation resistors 105 and 106 and has its output applied to the sum amplifier 77 unless grounded by the next lower in frequency circuit to which it is connected. Thus, the sum of each pair of resistors 105 and 106 is substantially the same as resistor 69 which does not have to be split into two resistors.

Figure 3:
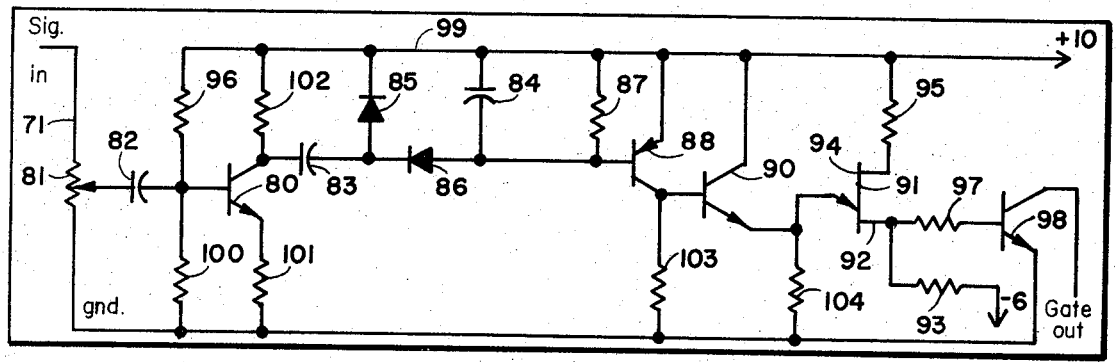
FIG. 3 is a schematic diagram of one signal detector and trigger circuit of FIG. 2.

Referring now to FIG. 3, one signal detector and trigger circuit 71 can be seen to have the signal applied to a Darlington amplifier transistor 80, (shown as a single transistor) having its base connected to the gain adjusting potentiometer 81, through coupling capacitor 82. The collector is connected through resistor 102 to buss 99 while the emitter is connected through resistor 101 to ground. The base is biased by resistor 100 to ground and by resistor 96 to conductor 99. The signal output from the amplifier 80 is full wave rectified by the rectifier circuit consisting of capacitors 83 and 84 and diodes 85 and 86. A resistor 87 is connected across the capacitor 84 and bleeds down capacitor 84 to reduce recovery time of the circuit. The DC output is applied to the base of the transistor 88 causing the transistor 88 to conduct and develop a voltage at its collector roughly proportional to the input signal. The collector of transistor 88 is connected to the base of transistor 90 which is connected as an emitter follower circuit to give the developed voltage a low impedance output. The output from the emitter of transistor 90 is applied to the emitter of unijunction transistor 91. Base 92 of transistor 91 is returned to a negative 6 volt power supply through resistor 93. Resistor 95, the interbase resistance for transistor 91 and resistor 93 divides the −6 and +10 volts so that the voltage of base 92 of transistor 91 is approximately −1 volt D.C., which is applied through resistor 97 to the base of transistor 98, insuring that transistor 98 is cut off and that the collector to ground impedance is very high. When the applied voltage to transistor 91 emitter electrode reaches its "peak point" transistor 91 triggers causing the voltage at 92 to rise to a positive 3 to 5 volts. When the base 92 of transistor 91 rises to a significant positive value transistor 98 is saturated, shorting out the output of the next higher filter which would be 62 in this case. When the signal input drops and the DC voltage at the emitter of transistor 90 drops low enough the emitter current of transistor 91 drops below the holding current and transistor 91 turns off enabling the output of the next higher filter. The circuit using the unijunction transistor 91 has a sufficient hysteresis loop to prevent the circuit from switching on and off when the signal is at the switching threshold. Resistor 103 couples the collector of transistor 88 to ground and resistor 104 couples the emitter of transistors 90 and 91 to ground.

The following values are provided to illustrate one working embodiment of the signal detector and trigger circuit 71 and are not intended to limit the scope of the present invention in any manner:

Transistors
    80 MPS A14 (Motorola)     Diodes    85 – 1 34
    88 MPS 6518     "                       86 – IN 34
    90 MPS 3392     "
    91 2N4871                            (microfarads)
    98 MPS 3392                 Capacitors 82 – 2
                                                  82 – 10
                                                  84 – 10
Resistors
    105 – 47 (kilo ohms)
    106 – 47 (kilo ohms)
    68 – 10 (kilo ohms)
    81 – 10 (variable)
    96 680
    100 – 100
    93 – 3.3
    102 – 6.8
    101 – 0.33
    87 – 47
    103 – 47
    104 – 10
    95 – 1
    97 – 4.7
    69 – 100

Accordingly, the present invention is not to be construed as limited to the particular forms disclosed herein, since these are to be regarded as illustrative rather than restrictive.

We claim:

1. A speech diagnostic and therapeutic apparatus comprising in combination:
   a. input means for receiving vocal sounds and generating a voltage signal therefrom;
   b. overload detector means connected to said input means for detecting vocal intensity of said input means vocal sounds in excess of predetermined levels and disabling said apparatus when said predetermined overload level is detected;
   c. signal detector means connected to said input means for indicating a predetermined minimum input signal level;
   d. harmonic inhibitor circuit connected to said input means for inhibiting harmonics of input vocal sounds;
   e. output means connected to said overload detector means, said signal detector means and said harmonic inhibitor circuit for producing an output indicative of the fundamental vocal frequency being above, below or within a predetermined frequency range and indicative of the vocal level exceeding a predetermined level; and
   f. A voltage comparator circuit for comparing the output of said harmonic inhibitor circuit and providing an indication of whether said output is above or below predetermined set levels.

2. The apparatus according to claim 1 in which said signal detector means disables said output means when the input signal fails to reach said predetermined level.

3. The apparatus according to claim 1 in which said output means includes visual lights to indicate said fundamental vocal frequency being above, below or within a predetermined frequency range and of the vocal level exceeding a predetermined level.

4. The apparatus in accordance with claim 1 in which said harmonic inhibitor circuit includes a plurality of frequency filters connected in parallel to said input means, said filters being adapted to inhibit harmonics in said input vocal sounds.

5. The apparatus according to claim 4 in which said harmonic inhibitor circuit includes a circuit means connected to said plurality of frequency filters for inhibiting the output of all filters having cutoff frequency outputs higher than the cutoff frequency of the filter having the lowest frequency output.

6. The apparatus according to claim 1 in which a timer means is connected to said apparatus for controlling time duration of input vocal responses.

7. The apparatus according to claim 6 in which said timer means, signal detector means and overload detector means each having relays connected in series for disabling said output means when any one of said relays is actuated.

8. The apparatus according to claim 1 wherein said output means comprises a visual indicator, and wherein said overload detector means disables said visual indicator when said predetermined overload level is detected.

9. The apparatus according to claim 8 further comprising:
  means for visually indicating when said received vocal sound is above or below a predetermined frequency range; and
  means for disabling said visual indicating means when said signal detector indicates a vocal input below said predetermined minimum input signal level.

* * * * *